C. C. BLISS.
LAMPS.

No. 185,208. Patented Dec. 12, 1876.

Witnesses.
Chas. H. Smith
Harold Serrell

Inventor
Charles C. Bliss.
for Lemuel W. Serrell
Atty.

UNITED STATES PATENT OFFICE.

CHARLES C. BLISS, OF NORWICH, CONNECTICUT.

IMPROVEMENT IN LAMPS.

Specification forming part of Letters Patent No. 185,208, dated December 12, 1876; application filed July 10, 1876.

*To all whom it may concern:*

Be it known that I, CHARLES C. BLISS, of Norwich, in the State of Connecticut, have invented an Improvement in Lamps, of which the following is a specification:

In Letters Patent heretofore allowed to me a float is represented operating upon a valve to close the passage-way between the fountain and the lamp as soon as the oil rises to the required height, and to open the orifice for the oil to pass from the fountain as soon as the oil in the lamp is consumed sufficiently to cause its descent below a given level.

My present improvement relates to the means for connecting the lever of the valve to the float, so as to insure a more reliable movement of the lever and float; also, to an improvement in the valve, whereby its position in relation to the lever can be varied, so as to allow the float to close the valve with greater or less depth of oil in the lamp.

Figure 1:
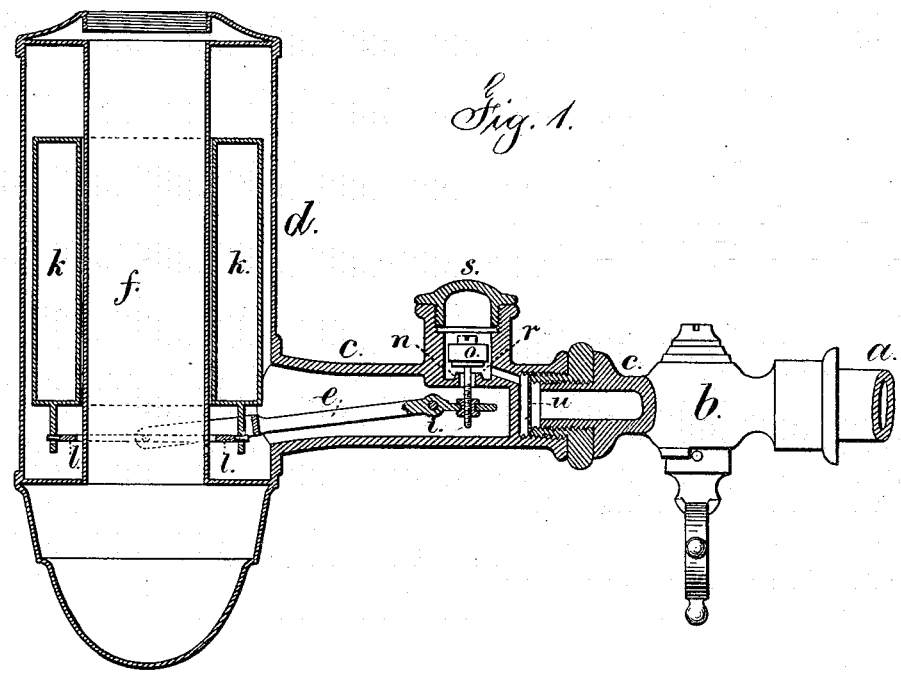
Figure 2:
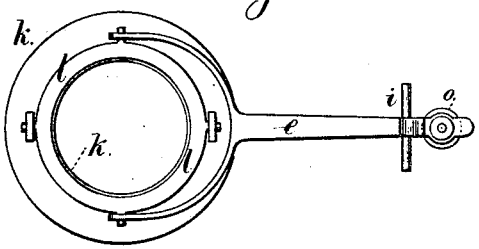

In the drawing, Figure 1 is a vertical section of the lamp, float, and lever; and Fig. 2 is an inverted plan of the lever and float.

The tube $a$ leads from any suitable fountain or reservoir holding oil to the cock $b$, and from the cock there is a pipe, $c$, leading to the lamp $d$. The object of this cock is to shut off the supply entirely in cases where it is desired to remove the lamp.

Within the tube $c$ is the lever $e$, upon a fulcrum, $i$, and within the lamp $d$ is the float $k$, which preferably is in a tubular form, so that the wick which hangs down from the burner can pass through the float.

The float $c$ and lever $e$ are connected by gimbals formed of the ring $l$, jointed in the line of one diameter to the float, and in the line of another diameter at right angles to the first, to arms that project from the end of the lever $e$.

This construction allows the float to rise and fall freely without binding upon the sides of the lamp $d$. There is also, by preference, an inner guide-tube, $f$, to prevent the wick coming into contact with the float. This tube $f$ must be perforated, to allow oil to pass into the wick-space.

The valve-seat $n$ is between the fountain and lamp. It is above the shorter arm of the lever $e$, and the valve $o$ is in the valve-chamber $r$ above the seat, and to this chamber $r$ there is a screw-cap, $s$, that can be removed to give access to the valve, or be screwed to its place tightly.

The stem of the valve is made as a screw, passing through the lever $e$, so that the position of the valve to the end of the lever can be changed by taking off the cap $s$ and rotating the valve. Hence, if the oil rises too high in the lamp before the valve closes, the cap $s$ is to be taken off, and the valve screwed down, and vice versa, so that the height of oil in the lamp can be regulated as desired.

The nut in the lever for the screw-stem of the valve should be separate, and sufficiently loose to allow the valve to accommodate itself to the seat; but such nut does not revolve in the eye of the lever that receives it.

There is a fine wire-gauze strainer introduced at $u$ in the pipe $c$, to prevent the passage with the oil of any particles that would obstruct the valve.

In cases where the valve-seat is made at the end of the inlet-pipe, the pipe should be bent up vertically, and the gimbals and float in that case will be above such inlet and valve, and the intervening lever will carry the valve upon its short arm.

The valve and float will serve to regulate the height of oil in several burners when they are connected by branch or flexible pipes with the chamber containing the floats. The reservoirs for these burners all must be at the same level, or nearly so.

I claim as my invention—

1. The combination, with the lamp, float, lever, and valve, of gimbals, connecting the lever and float, for the purposes and as set forth.

2. The combination, in a lamp, of a float, lever, valve-seat, valve and screw stem, substantially as set forth, for varying the height at which the oil stands in the lamp, as specified.

3. The combination, with a lamp, of a float, lever, valve, valve-seat, strainer, and cock, arranged and operating substantially as and for the purposes set forth.

Signed by me this 28th day of June, A. D. 1876.

CHARLES C. BLISS.

Witnesses:
 WM. H. JENNINGS, Jr.,
 SOLOMON LUCAS.